United States Patent
Lee et al.

(10) Patent No.: US 11,662,593 B2
(45) Date of Patent: May 30, 2023

(54) FOLDING-TYPE WEARABLE ELECTRONIC DEVICE WITH OPTICAL TRANSFERRING MEMBER FOR TRANSFERRING LIGHT TO TRANSPARENT MEMBER FROM PROJECTOR

(71) Applicant: Samsung Electronics Co., Ltd., Gyeonggi-do (KR)

(72) Inventors: Yunguk Lee, Gyeonggi-do (KR); Yoonseok Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 17/140,193

(22) Filed: Jan. 4, 2021

(65) Prior Publication Data

US 2021/0124175 A1     Apr. 29, 2021

Related U.S. Application Data

(63) Continuation of application No. 16/237,982, filed on Jan. 2, 2019, now Pat. No. 10,884,247.

(30) Foreign Application Priority Data

Jan. 10, 2018   (KR) .................. 10-2018-0003423

(51) Int. Cl.
*G02B 27/01*     (2006.01)
*G06F 1/16*     (2006.01)
(Continued)

(52) U.S. Cl.
CPC ........... *G02B 27/0176* (2013.01); *G01B 7/30* (2013.01); *G02B 6/0025* (2013.01);
(Continued)

(58) Field of Classification Search
CPC ............. G02B 27/0176; G02B 6/0025; G02B 6/0026; G02B 6/0038; G02B 27/017;
(Continued)

(56) References Cited

U.S. PATENT DOCUMENTS 6,530,660 B1     3/2003   Chao et al.
2006/0017657 A1  1/2006   Yamasaki
(Continued)

FOREIGN PATENT DOCUMENTS

GB       2394381 A        4/2004
JP       H10-301055 A     11/1998
(Continued)

OTHER PUBLICATIONS

Indian Search Report dated Jul. 6, 2021.
Chinese Search Report dated Jul. 13, 2021.
Chinese Search Report dated Jan. 6, 2022.
European Office Action dated Oct. 24, 2022.
Notice of Preliminary Rejection dated Jan. 10, 2023.

*Primary Examiner* — William Choi
(74) *Attorney, Agent, or Firm* — Cha & Reiter, LLC

(57) ABSTRACT

One or more embodiments of the present disclosure may include: a transparent member; a housing coupled to the transparent member in a rotatable manner via a hinge portion, such that the housing is foldable in a designated direction with respect to the transparent member; a projector at least partially disposed in the housing; and an optical transferring member configured to guide light emitted from the projector to the transparent member when the housing is unfolded with respect to the transparent member in an unfolded state.

20 Claims, 12 Drawing Sheets

(51) Int. Cl.
*F21V 8/00* (2006.01)
*G02C 5/22* (2006.01)
*G02C 11/00* (2006.01)
*G01B 7/30* (2006.01)

(52) U.S. Cl.
CPC ......... *G02B 6/0026* (2013.01); *G02B 6/0038* (2013.01); *G02B 27/017* (2013.01); *G02B 27/0172* (2013.01); *G02C 5/22* (2013.01); *G02C 11/10* (2013.01); *G06F 1/1635* (2013.01); *G06F 1/1639* (2013.01); *G06F 1/1677* (2013.01); *G06F 1/1683* (2013.01); *G02B 2027/0154* (2013.01); *G02B 2027/0178* (2013.01); *G02C 2200/02* (2013.01)

(58) Field of Classification Search
CPC ........ G02B 27/0172; G02B 2027/0154; G02B 2027/0178; G01B 7/30; G02C 5/22; G02C 11/10; G02C 2200/02; G06F 1/1635; G06F 1/1639; G06F 1/1677; G06F 1/1683
USPC .................................. 359/630–633; 345/7–9
See application file for complete search history.

(56) References Cited

U.S. PATENT DOCUMENTS

| | | | |
|---|---|---|---|
| 2010/0103077 A1 | 4/2010 | Sugiyama et al. | |
| 2014/0375681 A1* | 12/2014 | Robbins | G02B 27/017 345/633 |
| 2017/0075119 A1 | 3/2017 | Schultz et al. | |
| 2017/0371164 A1 | 12/2017 | Liao | |

FOREIGN PATENT DOCUMENTS

| | | | |
|---|---|---|---|
| JP | 2008-22358 A | | 1/2008 |
| JP | 2008-22362 A | | 1/2008 |
| JP | 2008-22364 A | | 1/2008 |
| JP | 2008022358 A | * | 1/2008 |
| JP | 4642400 B2 | | 3/2011 |
| JP | 2015-504616 A | | 2/2015 |
| KR | 10-2016-0075571 A | | 6/2016 |
| KR | 10-2017-0016192 A | | 2/2017 |
| WO | 2009/057171 A1 | | 5/2009 |
| WO | 2014/111966 A1 | | 7/2014 |

\* cited by examiner

FOLDING-TYPE WEARABLE ELECTRONIC DEVICE WITH OPTICAL TRANSFERRING MEMBER FOR TRANSFERRING LIGHT TO TRANSPARENT MEMBER FROM PROJECTOR

CROSS REFERENCE TO RELATED APPLICATION(S)

This application is a Continuation of U.S. patent application Ser. No. 16/237,982 filed on Jan. 2, 2019 which claims priority under 35 U.S.C. § 119 to Korean Patent Application No. 10-2018-0003423, filed on Jan. 10, 2018, in the Korean Intellectual Property Office, the disclosure of which is incorporated by reference herein in its entirety.

BACKGROUND

Field

Various embodiments of the present disclosure generally relate to a folding-type wearable electronic device that may be worn as eyeglasses.

Description of Related Art

In an Augmented Reality (AR) wearable device, an image (an optical signal) emitted through a projector passes through a prism and then a waveguide, so as to output a picture to the user's eyes.

Conventionally, AR wearable devices that are in the shape of eyeglasses typically have fixed temples such that the eyeglasses cannot be folded. This is due to rigidity of the waveguide.

SUMMARY

The above presents a disadvantage because as the temple portion is constructed to be fixed and thus cannot be folded with respect to the frame of the AR wearable devices, the devices cannot be easily stored and there is a risk that the devices may be damaged when they are carried by the user.

One or more embodiments of the present disclosure may provide a wearable electronic device that can be folded. The temple portion of the wearable device may include a projector and a prism, and the temple portion may be constructed to be foldable with respect to the frame of the device, thereby allowing the device to be easily being stored and preventing damage when it is stored.

One or more embodiments of the present disclosure may provide a folding-type wearable electronic device of which the temple portion is replaceable and thus can be easily repaired.

One or more embodiments of the present disclosure may provide a folding-type wearable electronic device which implements a reliable guided wave structure of an optical signal by providing a structure in which the temple portion is fixed when the device is unfolded.

One or more embodiments of the present disclosure may provide a folding-type wearable electronic device which recognizes when the device is folded or unfolded, thereby reducing electric current consumption of the device. For example, the optical system of the wearable device may be automatically turned off when the device is folded.

One or more embodiments of the present disclosure may include: a transparent member; a housing coupled to the transparent member in a rotatable manner via a hinge portion, such that the housing is foldable in a designated direction with respect to the transparent member; a projector at least partially disposed in the housing; and an optical transferring member configured to guide light emitted from the projector to the transparent member when the housing is unfolded with respect to the transparent member in an unfolded state.

One or more embodiments of the present disclosure may include: at least one transparent member; a transparent member frame which supports the transparent member; first and second temple portions coupled to the transparent member frame in a rotatable manner so that the first and second temple portions can be folded or unfolded with respect to the transparent member frame; a light source disposed in the first temple portion; at least one optical system configured to guide a wave path of an optical signal emitted from the light source to a user's eyes; and a fixing device disposed between the transparent member frame and the first temple portion to provide a force for maintaining an unfolding state of the first temple portion with respect to the transparent member frame.

A wearable electronic device according to one or more embodiments of the present disclosure may include: a transparent member; a housing coupled to the transparent member in a rotatable manner via a hinge portion, such that the housing is foldable in a designated direction with respect to the transparent member; a projector at least partially disposed in the housing; a recognition device at least partially disposed in the housing to recognize an unfolded state or a folded state of the housing; and a controller configured to control the projector to emit light when the housing is in the unfolded state, and control the projector to cease emission of the light when the housing is in the folded state.

A wearable electronic device according to one or more embodiments of the present disclosure can be easily stored, and can be safely stored when it is being carried.

According to one or more embodiments of the present disclosure, electric current consumption of the optical system of the wearable electronic device can be reduced by recognizing whether the device is folded or unfolded.

According to one or more embodiments of the present disclosure, the temple portion of the wearable electronic device may be replaceable, thereby various components of the device, such as the battery, the optical system, etc., can be easily upgraded.

Additional aspects of the present disclosure will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
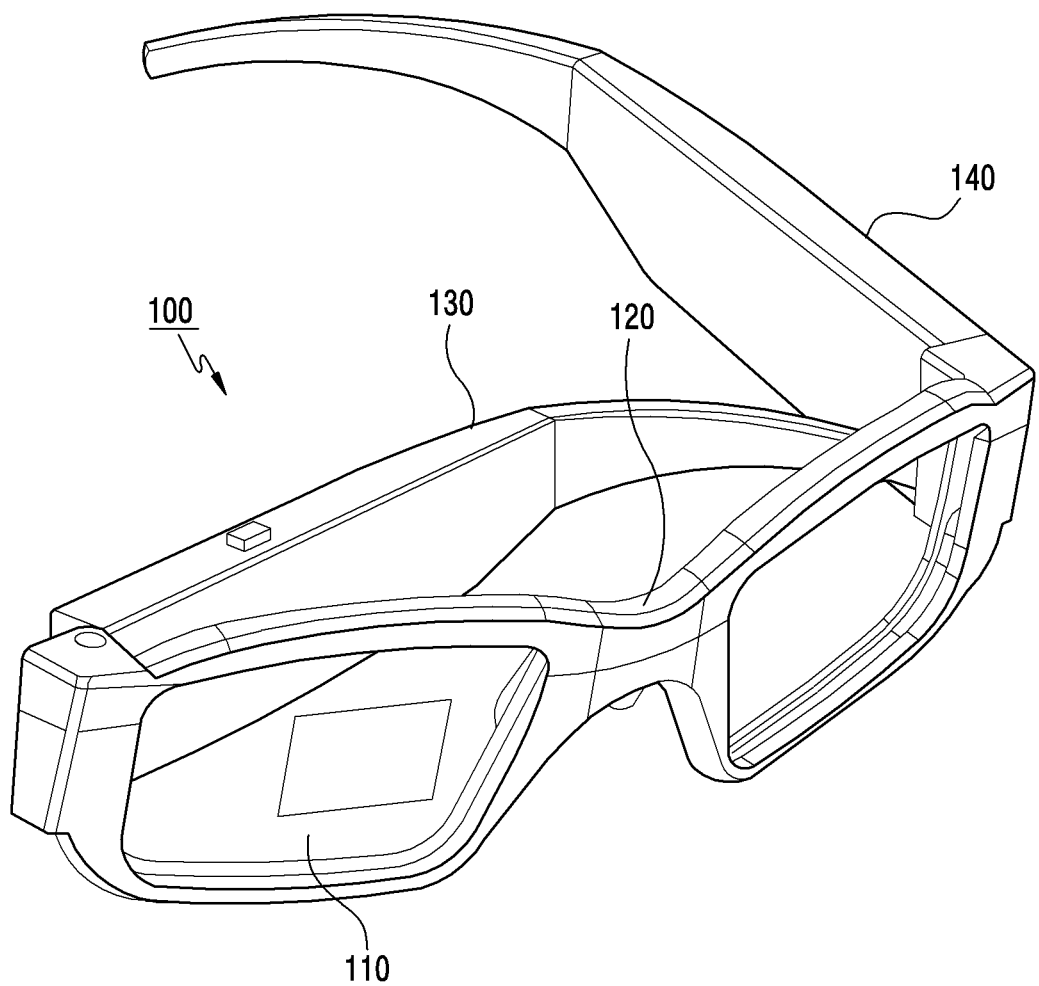
FIG. 1A, FIG. 1B and FIG. 1C are perspective views illustrating an electronic device in which a first housing is folded in a designated direction according to an embodiment of the present disclosure.

Hereinafter, various embodiments of the present disclosure are described with reference to the accompanying drawings. It should be appreciated, however, it is not intended to limit the embodiments of the present disclosure to the particular form disclosed, but, on the contrary, it is intended to cover all modifications, equivalents, and alternatives falling within the spirit and scope of the embodiments of the present disclosure. Like reference numerals denote like components throughout the drawings.

Figure 1B:
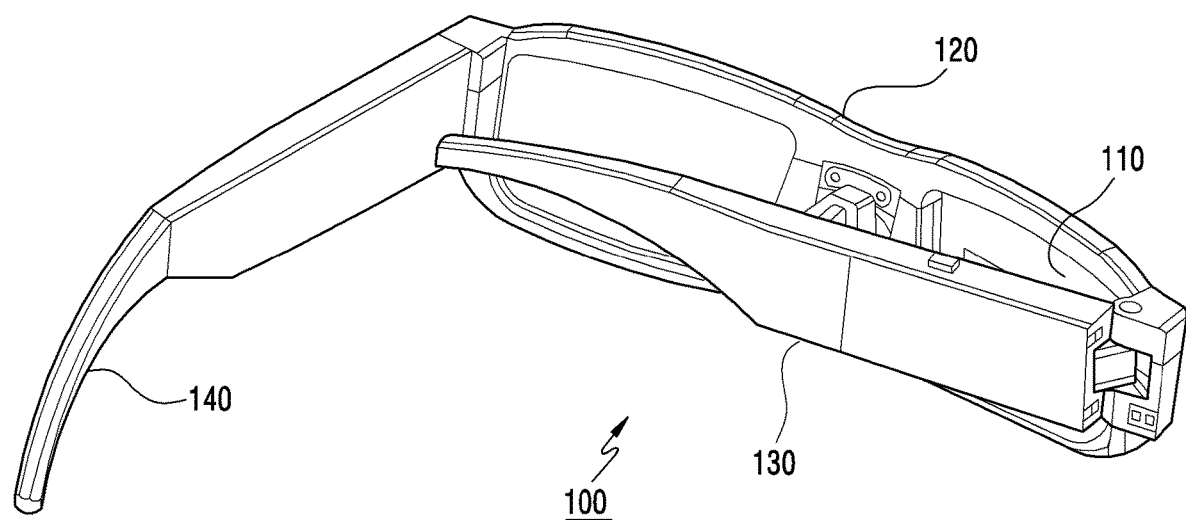
Figure 1C:
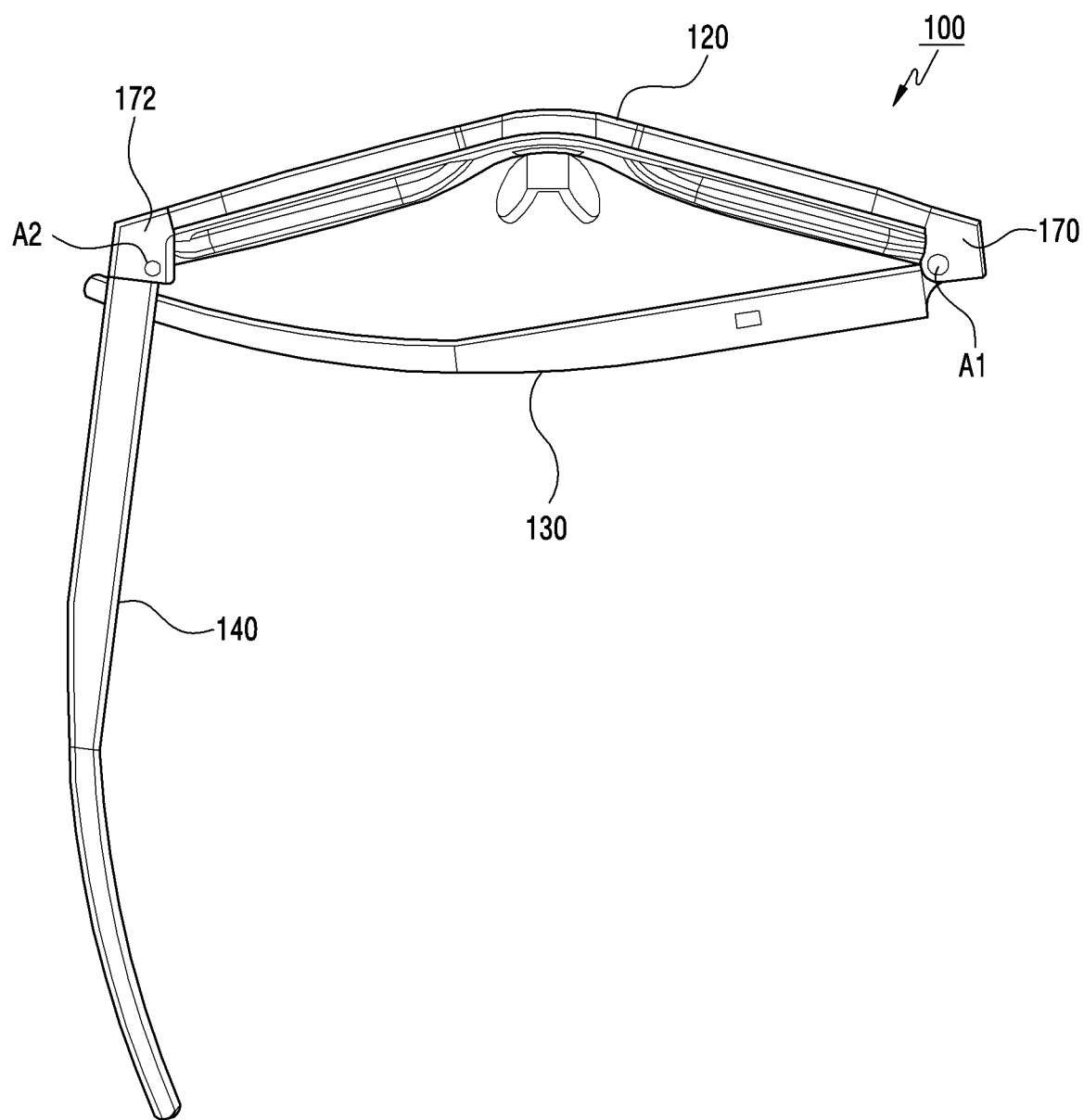
Figure 2A:
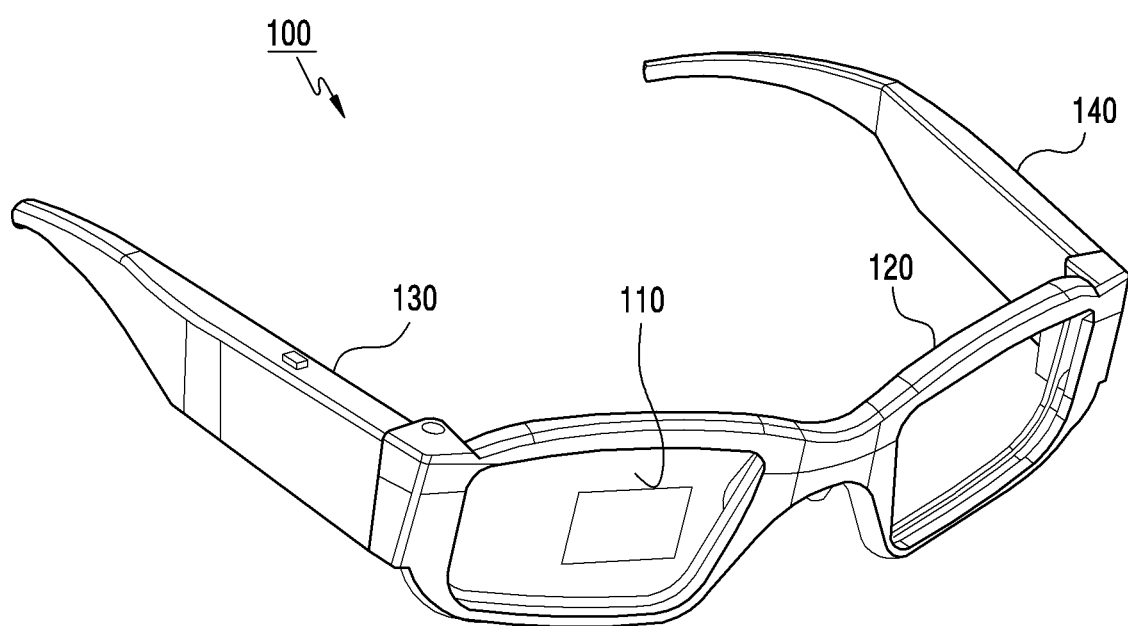
FIG. 2A and FIG. 2B are perspective views illustrating an electronic device in which first and second housings are unfolded in a designated direction according to an embodiment of the present disclosure.
Figure 2B:
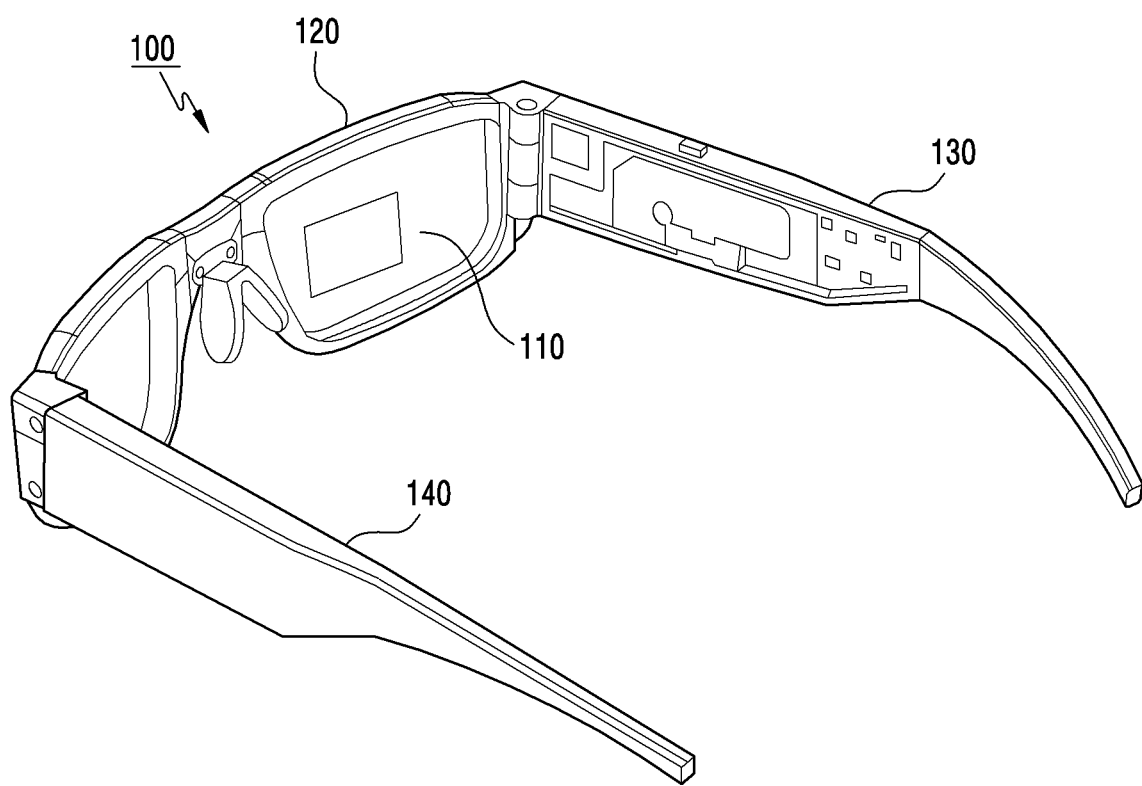
Figure 2C:
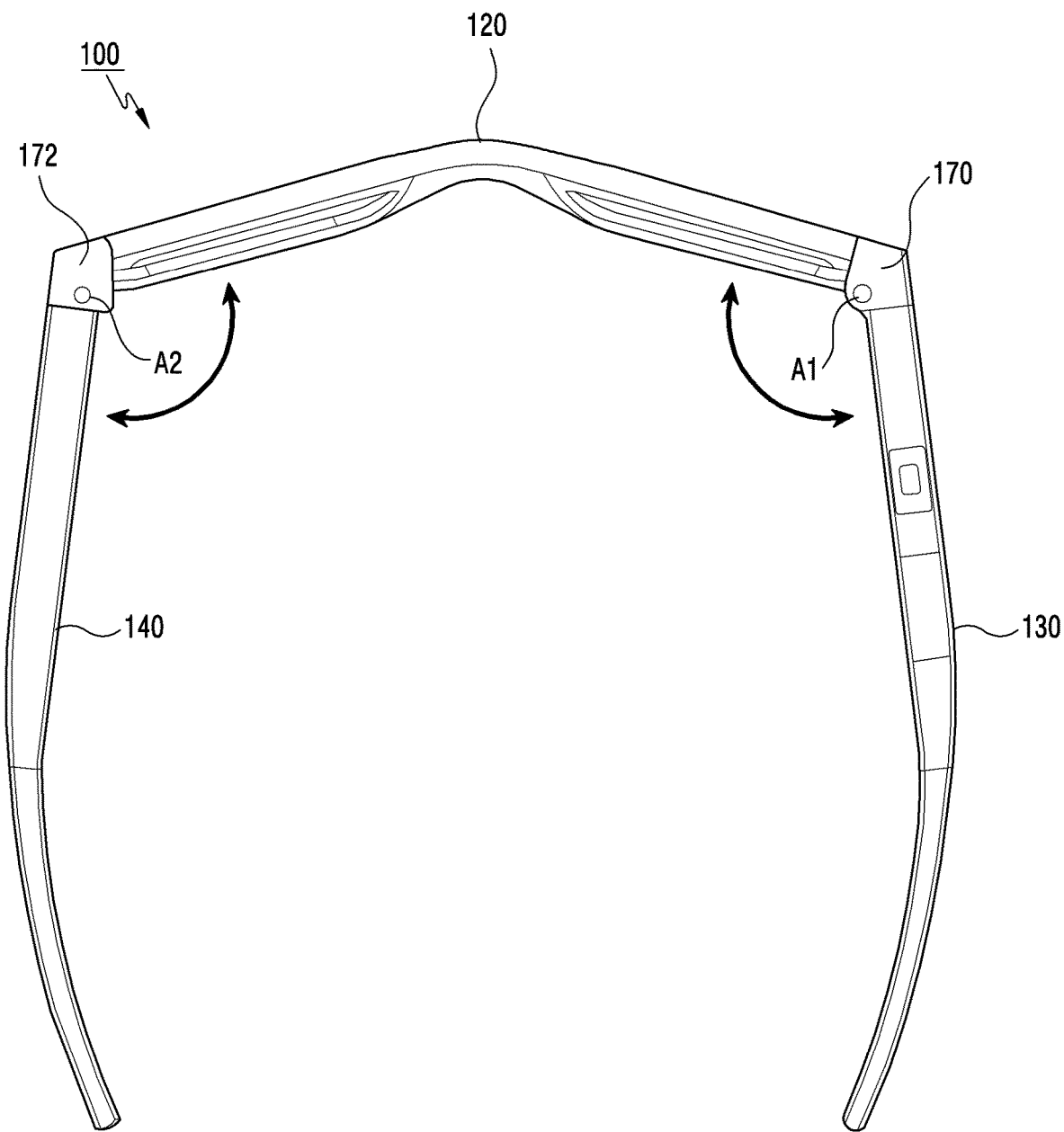
FIG. 2C is a plan view illustrating an electronic device in which first and second housings are unfolded in a designated direction according to an embodiment of the present disclosure.

FIGS. 1A-1C are perspective views illustrating an electronic device in which a first housing is folded in a designated direction according to an embodiment of the present disclosure. FIGS. 2A-2B are perspective views illustrating an electronic device in which first and second housings are unfolded in a designated direction according to an embodiment of the present disclosure. FIG. 2C is a plan view illustrating an electronic device in which first and second housings are unfolded in a designated direction according to an embodiment of the present disclosure.

Referring to FIGS. 1A-2C, as a wearable device, an electronic device 100 according to an embodiment may be a device that can be worn on a specific portion of the user's body. For example, the electronic device 100 may be an eyeglasses-type device which can be worn on the user's face. Therefore, the electronic device 100 according to an embodiment may have structures substantially similar to those of eyeglasses. In addition, the electronic device 100 according to an embodiment may have two housings, i.e., first and second housings (first and second temple portions) 130 and 140, that can be folded or unfolded with respect to the frame (transparent member frame) 120, similar to eyeglasses. In one example, the electronic device 100 may be an Augmented Reality (AR) wearable device.

The electronic device 100 according to an embodiment may include a transparent member 110, the transparent member frame 120, and the housings 130 and 140. For example, as eyeglasses, the electronic device 100 may have a pair of transparent members 110 and a pair of housings 130 and 140.

For example, the transparent members may include the first transparent member 110 and a second transparent member (not shown in the figure), and the housings may include the first housing 130 and the second housing 140.

The housings 130 and 140 may be coupled to the frame 120 in a rotatable manner. Hereinafter, the pair of housings may be referred to as the first housing 130 and the second housing 140. In addition, the first housing 130 may be referred to as a first temple portion, and the second housing 140 may be referred to as a second temple portion.

The first transparent member 110 according to an embodiment may be an optical member having a waveguide function for passing an optical signal (described in detail below) and a reflection function for changing the path of the optical signal by reflecting the optical signal. Therefore, the first transparent member 110 may be referred to as a waveguide through which the optical signal is guided, and may be referred to as a reflection optical member or optical reflection member that can change the path of the optical signal. For example, the first transparent member 110 may include glass, transparent synthetic resin, and/or the like.

The transparent member frame 120 according to an embodiment may have a support structure for supporting the first transparent member 110 and the second transparent member (not shown in the figure), and thus may be referred to as a transparent member support frame, a waveguide support frame, a waveguide support body, or the like.

The electronic device 100 according to an embodiment may be folded or unfolded since the first and second housings 130 and 140 are coupled to the transparent member frame 120 in a rotatable manner. The first and second housing 130 and 140 may be folded in a designated first direction, for example, in a direction in which the housings become close to each other, and may be unfolded in a designated second direction, for example, in a direction in which the housings become separated from each other. When the housing 130 is folded with respect to the transparent member frame 120 or the first transparent member 110, the optical transferring member of the electronic device (described below) may be disposed not to be physically in contact with the transparent member frame 120 or the transparent member 110.

The electronic device 100 according to an embodiment may have first and second hinge portions 170 and 172 disposed between the transparent member frame 120 and the first and second housings 130 and 140 respectively. The first and second hinge portions 170 and 172 may respectively define a first hinge axis A1 and a second hinge axis A2. The first housing 130 may be folded or unfolded in a designated first direction with respect to the transparent member frame 120 by rotating about the first hinge axis A1, and the second housing 140 may be folded or unfolded in a designated second direction with respect to the transparent member frame 120 by rotating about the second hinge axis A2.

The electronic device 100 according to an embodiment may be divided into two regions about the center line of the transparent member frame 120. That is, it may be divided into a first structure and a second structure. The first structure may include the first transparent member 110, one lateral portion of the transparent member frame 120, and the first housing 130. The second structure may include the second transparent member (not shown), the other lateral portion of the transparent member frame 120, and the second housing 140.

In the first structure, an optical system may be disposed in the housing 130 and the one lateral portion, so that an optical signal emitted from a light source is output to the user's eyes. In the second structure, a power supply device, for example, a battery (e.g., the battery 889 of FIG. 8) may be disposed in the second housing 140. In addition, although not shown, the second structure may be configured to be the same as the first structure. For example, another projector and optical transferring member may be constructed in the second housing 140, and first and second gratings (described below) may be included for the second transparent member. In this example, the wearable electronic device may include two optical systems for the user's left and right eyes, and thus the emitted optical signals are output to both of the user's eyes. In addition, the battery may be disposed in each of the first and second housings 130 and 140 so that the electronic device 100 is properly weight-balanced.

In addition, a processor (e.g., the processor 820 of FIG. 8) may be disposed in the first structure. The processor may control a light source (e.g. a projector) to emit light when the first housing 130 is unfolded with respect to the first transparent member 110, and may control the light source to cease emission of light when the first housing 130 is folded with respect to the first transparent member 110. As described below, the processor may turn the light source on or off depending on if the electronic device 100 is folded or unfolded. The processor 820 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Figure 3:
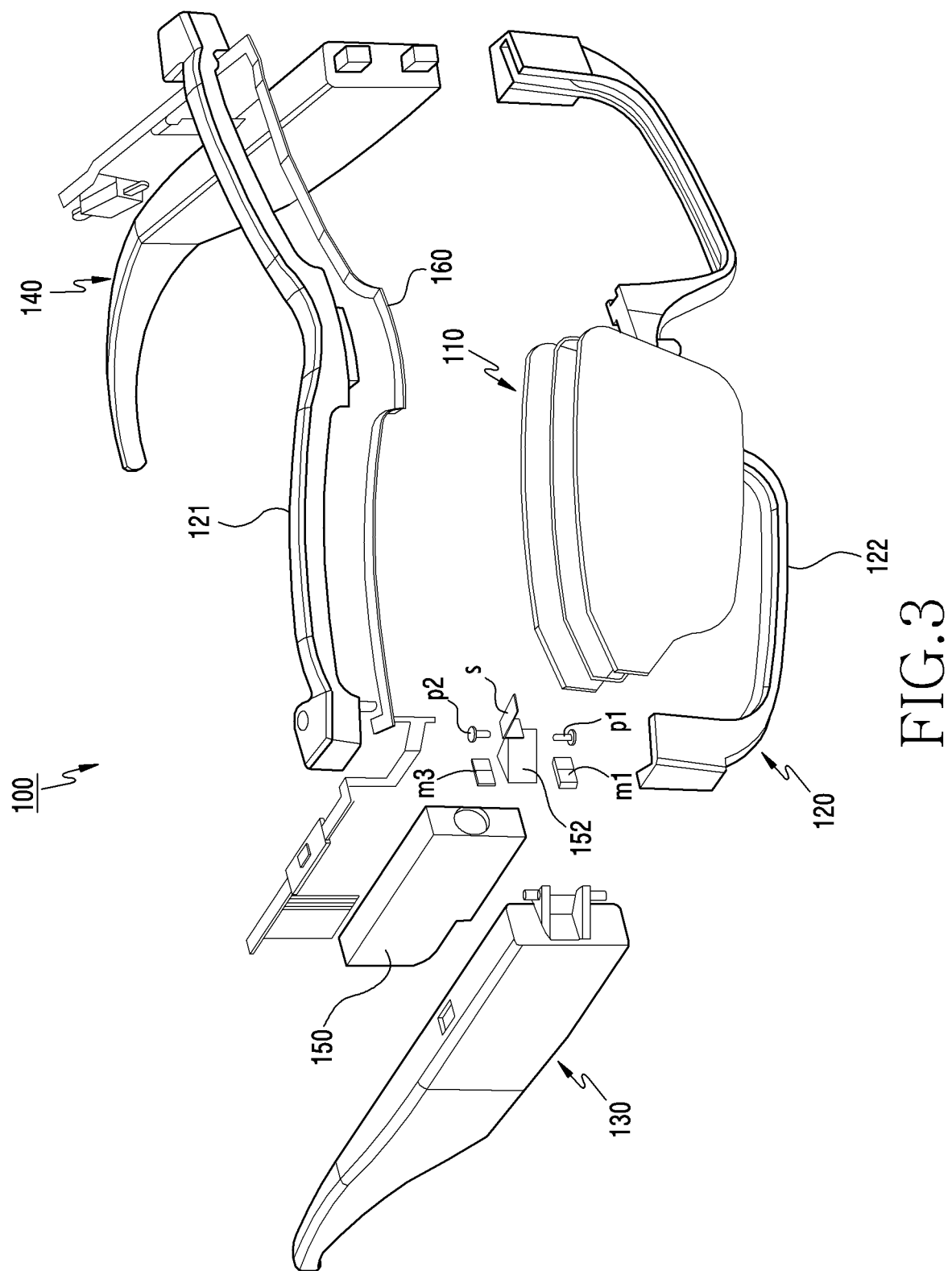
FIG. 3 and FIG. 4 are exploded perspective views illustrating various structures of an electronic device according to an embodiment of the present disclosure.
Figure 4:
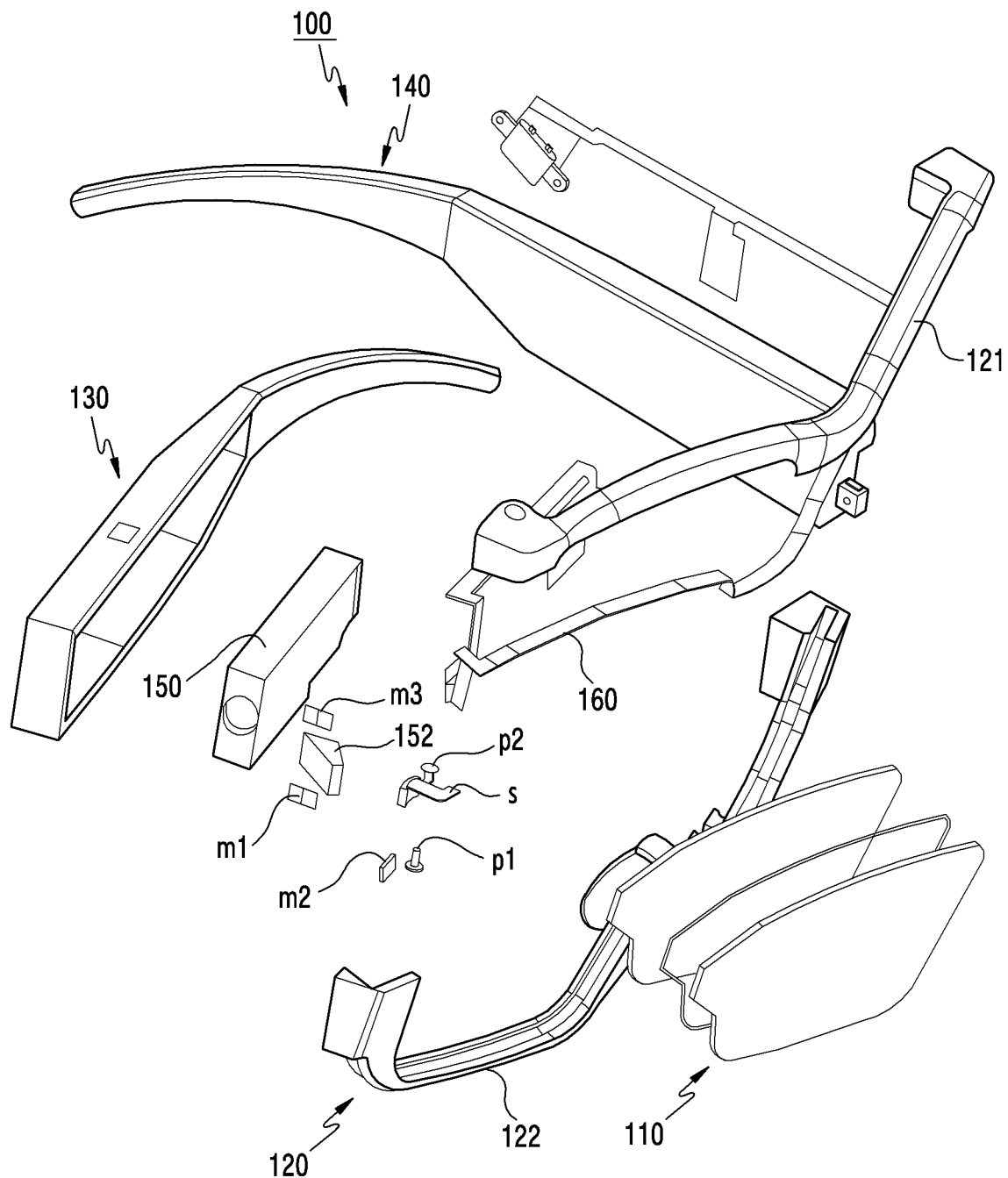

FIG. 3 and FIG. 4 are exploded perspective views illustrating various structures of an electronic device according to an embodiment of the present disclosure.

Referring to FIG. 3 and FIG. 4, an optical system mounted on the electronic device according to an embodiment may include a light source 150, an optical transferring member 152, optical reflection members 154 to 156 (shown in FIG. 5), and the transparent member 110. The light source 150 and the optical transferring member 152 may be disposed in the first housing 130, and the optical reflection member may be included in the first transparent member 110. A portion of the first transparent member 110 may serve as a waveguide. For example, one portion of the transparent member 110 may be utilized as a waveguide of an optical signal. The other portion may be utilized as a reflection member for changing the path of the optical signal.

The light source 150 according to an embodiment may be disposed in the first housing 130, and for example may be a projector (i.e. hereinafter, the light source may be referred to as a projector). The projector 150 may have an image output unit to emit an image optical signal received from the processor 820 of FIG. 8. The optical signal emitted from the projector 150 may be output to the optical transferring member 152.

The optical transferring member 152 according to an embodiment may receive the optical signal emitted from the projector 150 and thereafter may change the path of the received optical signal. For example, the optical transferring member 152 may include a prism. One surface of the optical transferring member 152 may be disposed to face an output lens of the projector 150, and may be disposed in an end portion of the first housing 130. The end portion of the first housing 130 referred to here may be the portion that is coupled to the transparent member frame 120. The optical signal whose optical path is changed by the optical transferring member 152 may be output to a first optical reflection member 154 (shown in FIG. 5) disposed on one side of the first transparent member 110 and located in an end portion of the transparent member frame 120.

The end portion of the transparent member frame 120 referred to here may coincide with the portion of the transparent member 110 facing the end portion of the first housing 130.

Figure 5:
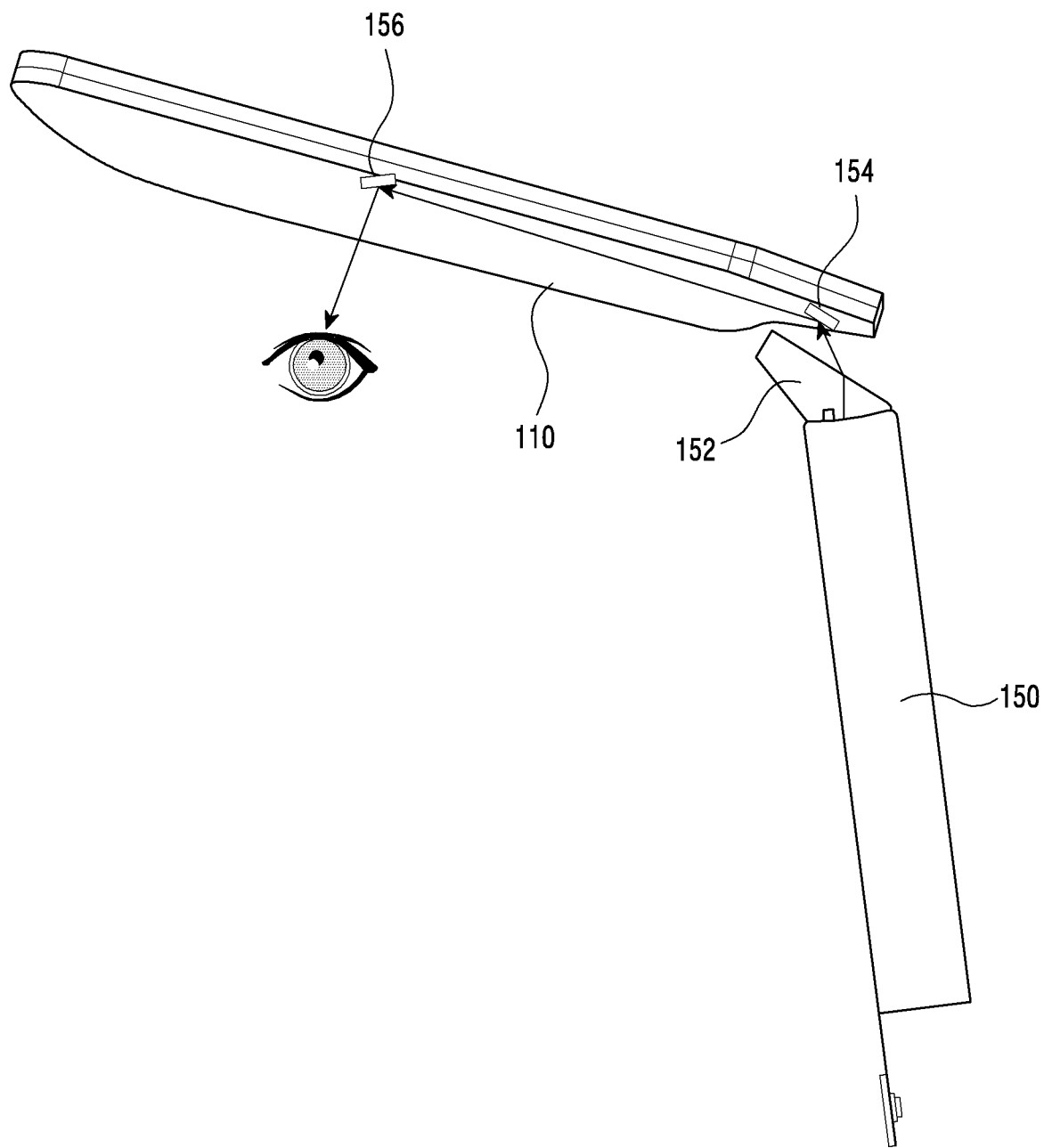
FIG. 5 is a plan view illustrating an optical signal path of an electronic device according to an embodiment of the present disclosure.

FIG. 5 is a plan view illustrating an optical signal path of an electronic device according to an embodiment of the present disclosure.

Referring to FIG. 5, the optical path of an optical signal emitted from the projector 150 may be changed primarily via the optical transferring member 152, and may be guided to be incident on the first optical reflection member 154. The first optical reflection member 154 may include a first grating structure (i.e. hereinafter, the first optical reflection member may be referred to as a first grating structure). For example, the first grating structure 154 may be made of a plurality of diffraction gratings.

The optical path of the optical signal may be further changed by the first grating structure 154, and may be guided by the first grating structure 154 to be incident on the second optical member 156 disposed in the transparent member 110. For example, the second optical reflection member 156 may include a second grating structure (i.e. hereinafter, the second optical reflection member is referred to as a second grating structure). The optical signal may be reflected by the second grating structure 156 so that it is incident on the user's eyes. For example, the second grating structure 156 may be made of a plurality of diffraction gratings.

Accordingly, the optical reflection member for changing the path of the optical signal according to an embodiment may include the first grating structure 154 disposed in a first portion of the transparent member 110 and the second grating structure 156 disposed in a second portion of the transparent member 110. For example, the first portion may be a peripheral portion of the transparent member, and the second portion may be a central portion of the transparent member. Thus, the transparent member 110 according to this embodiment may be used as a waveguide. The first grating structure 154 and the second grating structure 156 may be used as a waveguide so that an optical signal emitted from the first grating structure 154 may be output to the second grating structure 156. The optical signal may then be emitted to the user's eyes from the second grating structure 156.

According to another embodiment, the transparent member 110 may not include the optical reflection members 154 to 156. For example, the optical signal output from the projector 150 may be emitted to the user's eyes by being reflected between the front surface (e.g., the surface closest to the user's eyes) and the rear surface (e.g., the surface furthest from the user's eyes) of the transparent member 110.

Returning to FIG. 3 and FIG. 4, the transparent member frame 120 according to an embodiment may include an upper frame 121 and a lower frame 122. The first transparent member 110 may be fixed to be in between the upper and lower frames 121 and 122 of the transparent member frame 120. A tunnel-shaped opening may be constructed between the upper and lower frames 121 and 122 to house a flexible circuit board 160, which is further coupled to the second housing 140. In other words, the opening may be a path through which the flexible circuit board 160 passes.

Figure 6:
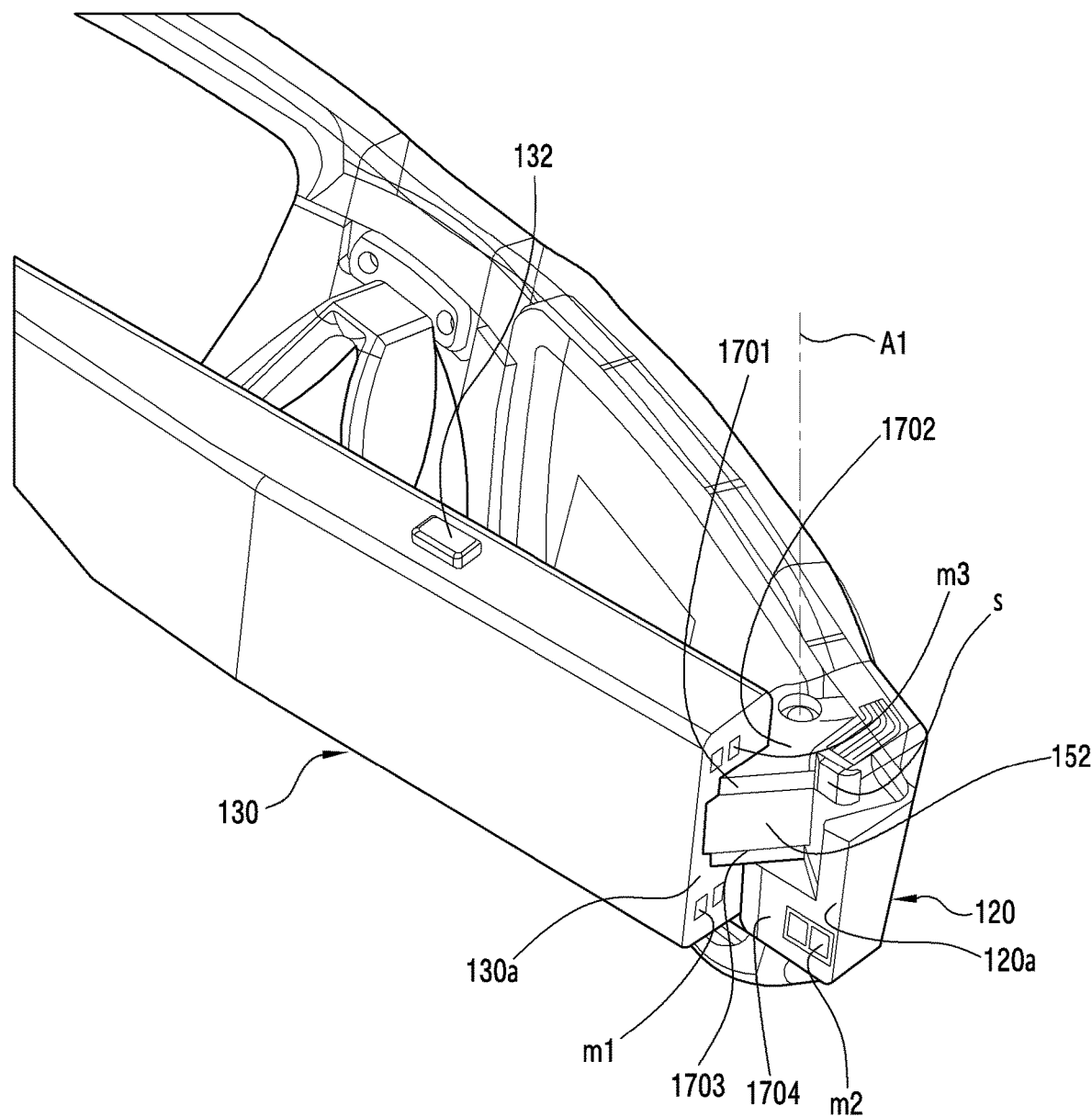
FIG. 6 is a perspective view illustrating structures of a fixing device and a folding/unfolding recognition device of an electronic device according to an embodiment of the present disclosure.

FIG. 6 is a perspective view illustrating structures of a fixing device and a folding/unfolding recognition device of an electronic device according to an embodiment of the present disclosure.

Referring to FIG. 3, FIG. 4, and FIG. 6, the electronic device 100 according to an embodiment may further include a fixing device between the transparent member frame 120 and the first housing 130. The fixing device may provide a force that maintains the unfolding state of the first housing 130. In other words, the fixing device may provide a retaining force for maintaining the unfolding state of the first housing 130.

The fixing device according to an embodiment may include first and second magnetic bodies m1 and m2. The first magnetic body m1 may be one or more magnetic members provided in the first housing 130 and may have a first polarity. The second magnetic body m2 may be one or more magnetic members provided in the transparent member frame 120 and may have a second polarity so that the first magnetic body m1 and the second magnetic body m2 generate an attractive force. When the first housing 130 is in the unfolding state with respect to the transparent member frame 120, the unfolding state may be maintained by the attractive force generated by the fixing device.

When the first housing 130 is in the unfolding state with respect to the transparent member frame 120, the first and second magnetic bodies m1 and m2 may be closely to each other or be in contact with each other. For example, when the first magnetic body m1 has an N pole and an S pole, the second magnetic body m2 may have a corresponding S pole and an N pole. The unfolding state of the first housing 130 may be fixed by the force of attraction between the first and second magnetic bodies m1 and m2.

The first magnetic body m1 according to an embodiment may be disposed to be exposed through an end 130a of the first housing 130, and the second magnetic body m2 may be disposed to be exposed through an end 120a of the transparent member frame 120. The first magnetic body m1 and the second magnetic body m2 may maintain the unfolding state of the first housing 130 due to the attractive force between the exposed surfaces. Each of the exposed surfaces of the first and second magnetic bodies m1 and m2 may be planar. According to another embodiment, the first magnetic body m1 and the second magnetic body m2 may not be exposed through the housings.

The first magnetic body m1 may be disposed below the optical transferring member 152. The electronic device may further include a third magnetic body m3 that is disposed above the optical transferring member 152. This way, both the first magnetic body m1 and the third magnetic body m3 may be disposed at the end 130a of the first housing 130.

The electronic device 100 according to an embodiment may further include a folding/unfolding recognition device (hereinafter, referred to as a recognition device) which recognizes whether the first housing 130 is in the unfolded state. The recognition device according to an embodiment may be used for turning off the optical system 150 when the first housing 130 is in the folded state, and turning on the optical system when the first housing 130 is in the unfolded state.

The recognition device according to an embodiment may include the third magnetic body m3 and a magnetic sensor s. As described above, the third magnetic body m3 may be provided in the first housing 130, and may be disposed to the end 130a of the first housing 130. For example, the third magnetic body m3 may be disposed to be exposed to or hidden from the end 130a of the first housing 130, and if it is disposed to be hidden from the end 130a of the first housing, may be disposed to be close to the surface of the first end 130a.

The magnetic sensor s according to an embodiment is a hall sensor, and may be provided in the end 120a of the transparent member frame 120 to provide a sensing signal indicating whether the first housing 130 is folded or unfolded. For example, when the electronic device 100 is in the folded state, since the third magnetic body m3 and the magnetic sensor s are relatively far apart from each other, the optical system 150 may be turned off due to the magnetic sensor s detecting the folded state. On the other hand, when the electronic device 100 is in the unfolded state, since the third magnetic body m3 and the magnetic sensor s are relatively close to each other, the optical system 150 may be turned on due to the magnetic sensor s detecting the unfolded state. Thus, using the magnetic sensor, electric current consumption of the electronic device can be reduced.

In another embodiment, the recognition device may further include an optical sensor (not shown in figures) that can detect the folded/unfolded states using a light receiving unit and light emitting unit. For example, when the electronic device is unfolded, light of the light emitting unit may be detected by the light receiving unit. In yet another embodiment, the recognition device may further include a physical switch operated by a pressing operation or a touch operation. The physical switch may include, for example, a tact switch. When the electronic device is unfolded, the physical switch may be depressed or touched.

For example, the optical sensor may be disposed to the housing 130 to detect the folding/unfolded state of the housing 130, and the physical switch may have a tact switch disposed to the housing 130 to detect the folding/unfolded state of the housing.

The recognition device according to another embodiment may have the third magnetic body m3 disposed in the transparent member frame 120 and the magnetic sensor s disposed in the first housing 130. Since the projector and the processor are disposed in the first housing 130, for ease of signal transmission between the processor and the magnetic sensor s, the magnetic sensor s may be disposed in the first housing 130. When the magnetic sensor s is disposed in the first housing 130, the processor and the magnetic sensor may be disposed on a single flexible circuit board.

Referring to FIG. 2 and FIG. 6, the electronic device 100 according to an embodiment may have the first and second hinge portions 170 and 172 to couple the first and second housings 130 and 140 respectively to both ends of the transparent member frame 120 in a rotatable manner. First and second hinge axes A1 and A2 may be provided respectively by the first and second hinge portions 170 and 172.

The first hinge portion 170 according to an embodiment may couple the first housing 130 to the transparent member frame 120 in a rotatable manner, and the second hinge portion 172 may couple the second housing 140 to the transparent member frame in a rotatable manner.

The first hinge portion 170 according to an embodiment may include a plurality of hinge arms 1701 to 1704 and hinge pins p1 and p2 (shown in FIG. 3). For example, the hinge pins p1 and p2 may be inserted to the hollow hinge arms 1701 to 1704. Among the hinge arms 1701 to 1704, the hinge arms 1701 and 1703 may be provided on the first housing 130, and the hinge arms 1702 and 1704 may be provided on the transparent member frame 120.

Among the hinge arms 1701 to 1704, at least some portions of the hinge arms 1701 and 1702 may be located above the optical transferring member 152, while at least some portions of the hinge arms 1703 and 1704 may be located below the optical transferring member 152. For example, the first hinge pin p1 may be inserted to the hinge arms 1701 and 1702 located above the optical transferring member 152, and the second hinge pin p2 may be inserted to the hinge arms 1703 and 1704 located below the optical transferring member 152. The optical transferring member 152 may be disposed between the hinge arms 1701/1702 and 1703/1704. FIG. 6 further shows reference numeral 132 which indicates an operation button of the projector.

The first hinge axis A1 of the first hinge portion 170 according to an embodiment may vertically penetrate the optical transferring member 152.

Hereinafter, operations of a projector provided in a wearable electronic device according to an embodiment of the present disclosure will be described with reference to FIG. 7.

Figure 7:
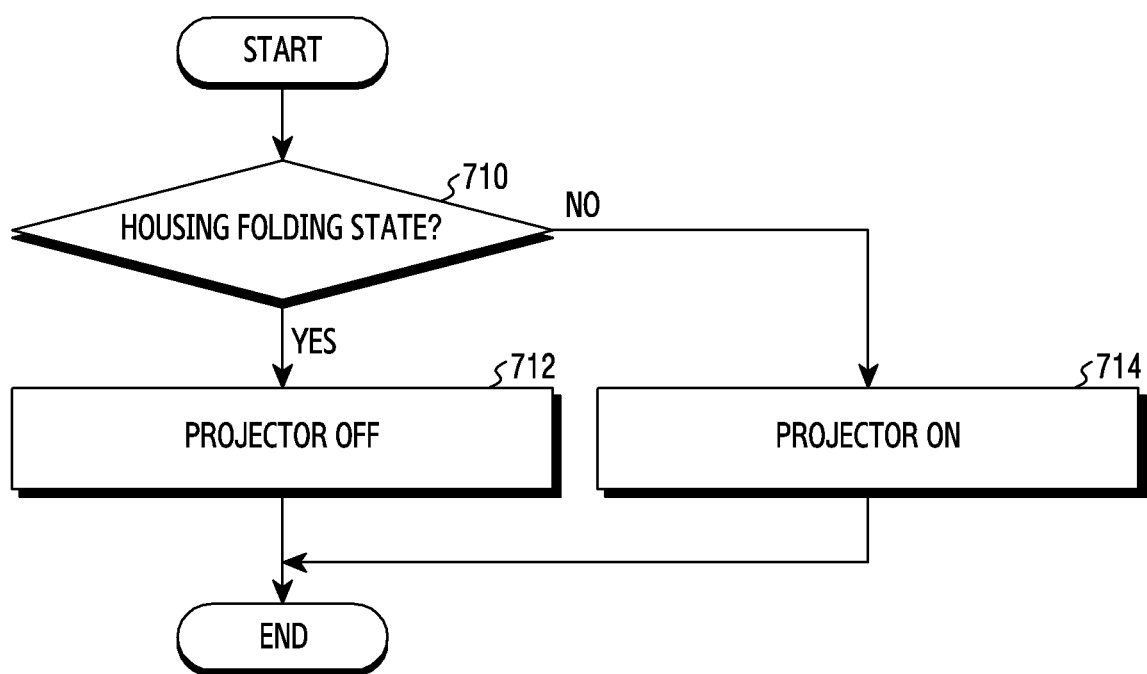
FIG. 7 is a flowchart illustrating an operation in which a projector is turned on or off depending on detections made by a magnetic sensor of an electronic device according to an embodiment of the present disclosure.

FIG. 7 is a flowchart illustrating an operation in which a projector is turned on or off depending on detections made by a magnetic sensor of an electronic device according to an embodiment of the present disclosure.

Referring to FIG. 7, at step 710, the electronic device according to an embodiment may turn the projector on or off by detecting the folded/unfolded state of a housing of the electronic device (i.e. the housing 130).

Figure 8:
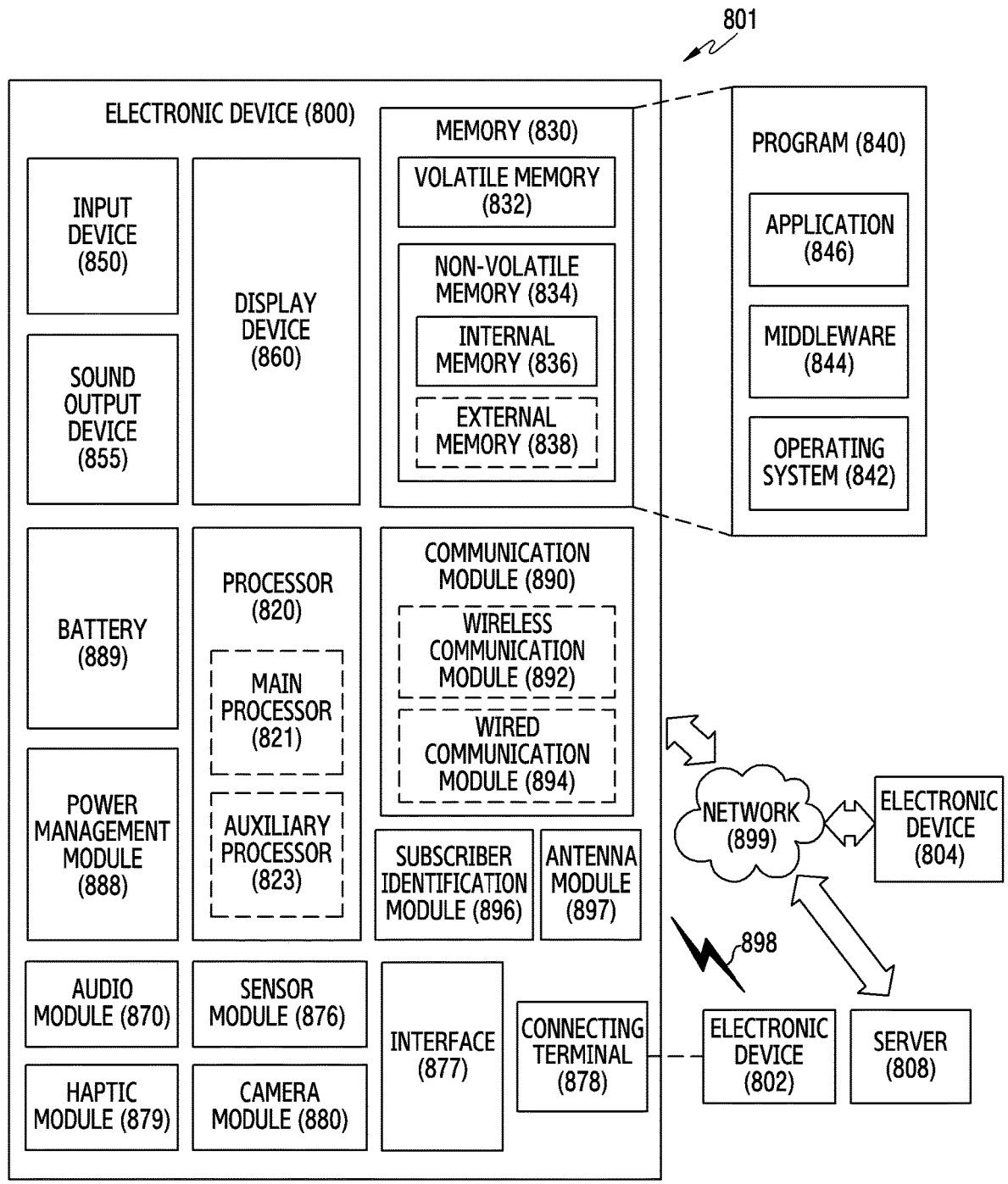
FIG. 8 is a block diagram of an electronic device in a network environment according to various embodiments of the present disclosure.

When the housing 130 of FIG. 1 is in the folded state, the processor 820 of FIG. 8 may control the projector to cease emission of light by turning off the projector 150 of FIG. 5 at step 712. As explained above, the processor 820 detects the folded state by using a sensing signal from the magnetic sensor s of FIG. 6. When the housing is in the unfolded state, the processor 820 of FIG. 8 may enable light emission from the projector by turning on the projector at step 714.

FIG. 8 is a block diagram of an electronic device 800 in a network environment 801 according to various embodiments. Referring to FIG. 8, the electronic device 800 in the network environment 801 may communicate with an electronic device 802 via a first network 898 (e.g., short-range wireless communication), or an electronic device 804 or a server 808 via a second network 899 (e.g., long-range wireless communication). According to an embodiment, the electronic device 800 may communicate with the electronic device 804 via the server 808. According to an embodiment, the electronic device 800 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a Subscriber Identification Module (SIM) 896, or an antenna module 897. In some embodiments, at least one (e.g., the display device 860 or the camera module 880) of the components may be omitted from the electronic device 800, or one or more other components may be added in the electronic device 800. In some embodiments, some of the components may be implemented in an integrated manner, for example, as in a case of the sensor module 876 (e.g., a fingerprint sensor, an iris sensor, or an illuminance sensor) embedded in the display device 860 (e.g., a display).

The processor 820 may drive, for example, software (e.g., a program 840) to control at least one other component (e.g., a hardware or software component) of the electronic device 800 coupled with the processor 820, and may perform various data processing or computation. The processor 820 may load a command or data received from other components (e.g., the sensor module 876 or the communication module 890) in a volatile memory 832, process the command or the data stored in the volatile memory 832, and store resulting data in a non-volatile memory 834. According to an embodiment, the processor 820 may include a main processor 821 (e.g., a Central Processing Unit (CPU) or an Application Processor (AP)), and an auxiliary processor 823 (e.g., a Graphics Processing Unit (GPU), an Image Signal Processor (ISP), a sensor hub processor, or a Communication Processor (CP)) that is operable independently from, or in conjunction with, the main processor 821. Additionally or alternatively, the auxiliary processor 823 may be adapted to consume less power than the main processor 821, or to be specific to a specified function. Herein, the auxiliary processor 823 may be implemented as separate from, or imbedded in the main processor 821.

In this case, the auxiliary processor 823 may control at least some of functions or states related to at least one component (e.g., the display device 860, the sensor module 876, or the communication module 890) among the components of the electronic device 800, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. The memory 830 may store various data, for example, software (e.g., the program 840) and input data or output data for a command related thereto, used by at least one component (e.g., the processor 820 or the sensor module 876) of the electronic device 800. The memory 830 may include the volatile memory 832 or the non-volatile memory 834.

The program 840 may be stored in the memory 830 as software, and may include, for example, an Operating System (OS) 842, middleware 844, or an application 846.

The input device 850 may be a device for receiving a command or data to be used by a component (e.g., the processor 820) of the electronic device 800 from the outside (e.g., a user) of the electronic device 800, and may include, for example, a microphone, a mouse, or a keyboard.

The sound output device 855 may be a device for outputting sound signals to the outside of the electronic device 800, and may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 860 may be a device for visually provide information to a user of the electronic device 800, and may include, for example, a display, a hologram device, or a projector and control circuitry to control a corresponding device. According to an embodiment, the display device 860 may include touch circuitry or a pressure sensor adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or, for example, an external electronic device (e.g., an electronic device 802, for example, a speaker or a headphone)) wiredly or wirelessly coupled with the electronic device 800.

The sensor module 876 may generate an electrical signal or data value corresponding to an internal operational state (e.g., power or temperature) of the electronic device 800 or an external environmental state. The sensor module 876 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illuminance sensor.

The interface 877 may support a specified protocol to be coupled with the external electronic device (e.g., the electronic device 802) wiredly or wirelessly. According to an embodiment, the interface 877 may include, for example, a High Definition Multimedia Interface (HDMI), a Universal Serial Bus (USB) interface, a Secure Digital (SD) card interface, or an audio interface.

A connection terminal 878 may include a connector via which the electronic device 800 may be physically connected with the external electronic device (e.g., the electronic device 802), and may include, for example, a HDMI connector, a USB connector, an SD card connector, or an audio connector (e.g., a headphone connector).

The haptic module 879 may convert an electrical signal into a mechanical stimulus (e.g., a vibration or a movement) or electrical stimulus which may be recognized by a user via tactile sensation or kinesthetic sensation. The haptic module 879 may include, for example, a motor, a piezoelectric element, or an electric stimulator.

The camera module 880 may capture still images or moving images. According to an embodiment, the camera module 880 may include one or more lenses, image sensors, image signal processors, or flashes.

The power management module 888 may be a module for managing power supplied to the electronic device 800, and may be implemented as at least part of, for example, a Power Management Integrated Circuit (PMIC).

The battery 889 may be a device for supplying power to at least one component of the electronic device 800, and may include, for example, a primary cell which is not rechargeable, a secondary cell which is rechargeable, or a fuel cell.

The communication module 890 may support establishing a wired communication channel or a wireless communication channel between the electronic device 800 and the external electronic device (e.g., the electronic device 802, the electronic device 804, or the server 808) and performing communication via the established communication channel. The communication module 890 may include one or more communication processors that are operable independently from the processor 820 (e.g., the Application Processor (AP)) and supports a wired communication or a wireless communication. According to an embodiment, the communication module 890 may include a wireless communication module 892 (e.g., a cellular communication module, a short-range wireless communication module, or a Global Navigation Satellite System (GNSS) communication module) or a wired communication module 894 (e.g., a Local Area Network (LAN) communication module or a Power Line Communication (PLC) module). A corresponding one of these communication modules may communicate with the external electronic device via the first network 898 (e.g., a short-range communication network, such as Bluetooth™, Wireless-Fidelity (Wi-Fi) direct, or Infrared Data Association (IrDA)) or the second network 899 (e.g., a long-range communication network, such as a cellular network, the Internet, or a computer network (e.g., LAN or Wide Area Network (WAN)). These various types of the communication modules 890 may be implemented as a single chip, or may be implemented as chips separate from each other.

According to an embodiment, the wireless communication module 892 may identify and authenticate the electronic device 800 in a communication network by using user information stored in the subscriber identification module 896.

The antenna module 897 may include one or more antennas for transmitting or receiving a signal or power to or from the outside. According to an embodiment, the communication module 890 (e.g., the wireless communication module 892) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, General Purpose Input and Output (GPIO), Serial Peripheral Interface (SPI), or Mobile Industry Processor Interface (MIPI)).

According to an embodiment, commands or data may be transmitted or received between the electronic device 800 and the external electronic device 804 via the server 808 coupled with the second network 899. Each of the electronic devices 802 and 804 may be a device of a same type as, or a different type from, the electronic device 800. According to an embodiment, all or some of operations to be executed at the electronic device 800 may be executed at one or more of the external electronic devices. According to an embodiment, if the electronic device 800 should perform a function or a service automatically, or in response to a request, the electronic device 800, instead of, or in addition to, executing the function or the service, may request the one or more external electronic devices to perform at least part of the function or the service. The external electronic devices receiving the request may perform the requested function or an additional function, and transfer an outcome of the performing to the electronic device 800. The electronic device 800 may provide the requested function or service, with or without further processing of the outcome. To that end, a cloud computing, for example, distributed computing, or client-server computing technology may be used.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present invention may be, for example, implemented as instructions stored in a computer-readable storage medium in a form of a programming module. In case that the instruction is executed by a processor (e.g., processor 820), and the processor may perform functions corresponding to the instructions. The computer-readable storage media may be the memory 830, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present invention, and vice versa.

The module or programming module according to the present invention may include at least one or more of the aforementioned constituent elements, or omit some of the aforementioned constituent elements, or further include additional other constituent elements. Operations carried out by the module, the programming module or the other constituent elements according to the present invention may be executed in a sequential, parallel, repeated or heuristic method. Also, some operations may be executed in different order or may be omitted, or other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Meanwhile, the exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An eyeglasses type wearable electronic device comprising:
   at least one transparent member;
   a transparent member frame which supports the transparent member and including a first magnetic body;
   first and second temple portions coupled to the transparent member in a rotatable manner so that the first and second temple portions can be folded or unfolded with respect to the transparent member frame, each of the first and second temple portions including a second magnetic body different from the first magnetic body; and
   a processor operatively connected with the transparent member and the first and second temple portions, wherein the processor is configured to:
     identify whether at least one of the first and second temple portions is folded or unfolded in a designated direction with respect to the transparent member frame while displaying an image including at least one virtual object on the transparent member, and
     control the transparent member to cease the displaying of the image, in response to identifying that the at least one of the first and second temple portions is folded in the designated direction,
   wherein an unfolding of the at least one of the first and second temple portions is fixed by the first magnetic body and the second magnetic body,
   wherein the transparent member frame further includes one of a third magnetic body and a magnetic sensor, and the at least one of the first and second temple portions further includes other one of the third magnetic body and the magnetic sensor, the third magnetic body being different from the first and second magnetic bodies, and
   wherein the processor identifies whether the at least one of the first and second temple portions is folded or unfolded based on a signal from the magnetic sensor.

2. The wearable electronic device of claim 1, wherein the processor is further configured to:
   detect a rotation by the at least one of the first and second temple portions, and
   identify that the at least one of the first and second temple portions is folded based on the detected rotation.

3. The wearable electronic device of claim 2, wherein the processor is further configured to:
   identify a distance between the transparent member frame and the at least one of the first and second temple portions using at least one of the magnetic sensor, an optical sensor or a switch disposed in the transparent member frame, and
   detect the rotation by the at least one of the first and second temple portions based on the identified distance.

4. The wearable electronic device of claim 2, wherein the processor detects the rotation by at least one of:
   detect whether the first temple portion rotates about a first hinge axis provided by a first hinge portion, or
   detect whether the second temple portion rotates about a second hinge axis provided by a second hinge portion,
   wherein the first hinge portion is disposed between the transparent member frame and the first temple portion, and
   wherein the second hinge portion is disposed between the transparent member frame and the second temple portion.

5. The wearable electronic device of claim 4,
   wherein the first hinge portion couples the first temple portion to the transparent member frame in the rotatable manner, and
   wherein the second hinge portion couples the second temple portion to the transparent member frame in the rotatable manner.

6. The wearable electronic device of claim 1, further comprising:
a light source disposed in the at least one of the first and second temple portions, and
wherein the processor is further configured to:
control the light source depending on if the wearable electronic device is folded or unfolded.

7. The wearable electronic device of claim 6, wherein the processor is further configured to:
control the light source to emit an image optical signal related to the image when the first and second temple portions are unfolded with respect to the transparent member frame; and
control the light source to cease emission of the image optical signal when the at least one of the first and second temple portions is folded with respect to the transparent member frame.

8. The wearable electronic device of claim 1, wherein the transparent member includes one or more grating structure to output the image.

9. The wearable electronic device of claim 1, wherein the processor is disposed in the transparent member frame or the at least one of the first and second temple portions.

10. The wearable electronic device of claim 1, wherein the processor is further configured to:
control the transparent member to display the image, in response to identifying that the first and second temple portions are unfolded in a direction in which the first and second temple portions become separate from each other.

11. A method for operating an eyeglasses type wearable electronic device, wherein the wearable electronic device comprises at least one transparent member, a transparent member frame which supports the transparent member and including a first magnetic body, and first and second temple portions coupled to the transparent member in a rotatable manner, each of the first and second temple portions including a second magnetic body different from the first magnetic body, the method comprising:
identifying whether at least one of the first and second temple portions is folded or unfolded in a designated direction with respect to the transparent member frame while displaying an image including at least one virtual object on the transparent member; and
ceasing the displaying of the image, in response to identifying that the at least one of the first and second temple portions is folded in the designated direction,
wherein an unfolding of the at least one of the first and second temple portions is fixed by the first magnetic body and the second magnetic body,
wherein the transparent member frame further includes one of a third magnetic body and a magnetic sensor, and the at least one of the first and second temple portions further includes other one of the third magnetic body and the magnetic sensor, the third magnetic body being different from the first and second magnetic bodies, and
wherein the identifying of whether the at least one of the first and second temple portions is folded or unfolded is based on a signal from the magnetic sensor.

12. The method of claim 11, wherein the identifying whether at least one of the first and second temple portions is folded or unfolded comprises:
detecting a rotation by the at least one of the first and second temple portions; and
identifying that the at least one of the first and second temple portions is folded based on the detected rotation.

13. The method of claim 12, wherein the detecting of the rotation comprises:
identifying a distance between the transparent member frame and the at least one of the first and second temple portions using at least one of the magnetic sensor, and optical sensor or a switch disposed in the transparent member frame; and
detecting the rotation by the at least one of the first and second temple portions based on the identified distance.

14. The method of claim 12, wherein the detecting of the rotation comprises:
detecting whether the first temple portion rotates about a first hinge axis provided by a first hinge portion; or
detecting whether the second temple portion rotates about a second hinge axis provided by a second hinge portion,
wherein the first hinge portion is disposed between the transparent member frame and the first temple portion, and
wherein the second hinge portion is disposed between the transparent member frame and the second temple portion.

15. The method of claim 14,
wherein first hinge portion couples the first temple portion to the transparent member frame in the rotatable manner, and
wherein the second hinge portion couples the second temple portion to the transparent member frame in the rotatable manner.

16. The method of claim 11, further comprising:
turning a light source on or off depending on if the wearable electronic device is folded or unfolded,
wherein the light source is disposed in the at least one of the first and second temple portions.

17. The method of claim 16, wherein the turning a light source on or off comprises:
emitting an image optical signal related to the image from the light source, when the first and second temple portions are unfolded with respect to the transparent member frame.

18. The method of claim 17, wherein the turning a light source on or off comprises:
ceasing emission of the image optical signal from the light source, when the at least one of the first and second temple portions is folded with respect to the transparent member frame.

19. The method of claim 11, wherein the transparent member includes one or more grating structure to output the image.

20. The method of claim 11, further comprising:
displaying the image, in response to identifying that the first and second temple portions are unfolded in a direction in which the first and second temple portions become separate from each other.

* * * * *